United States Patent [19]

Noro et al.

[11] Patent Number: 5,574,099
[45] Date of Patent: Nov. 12, 1996

[54] RUBBER-REINFORCED STYRENE RESIN COMPOSITION AND PROCESS FOR PRODUCING THE SAME

[75] Inventors: Masahiko Noro; Noriaki Ijuin; Akio Matsuda; Tateki Furuyama, all of Yokkaichi, Japan

[73] Assignee: Japan Synthetic Rubber Co., Ltd., Tokyo, Japan

[21] Appl. No.: 376,655

[22] Filed: Jan. 20, 1995

Related U.S. Application Data

[63] Continuation of Ser. No. 123,118, Sep. 20, 1993, abandoned, which is a continuation-in-part of Ser. No. 853,269, Mar. 18, 1992, abandoned.

[30] Foreign Application Priority Data

Mar. 18, 1991 [JP] Japan ..................................... 3-077247

[51] Int. Cl.$^6$ ..................................................... C08L 51/04
[52] U.S. Cl. ............................... 525/71; 525/73; 525/74; 525/76; 525/78; 525/80; 525/83; 525/84
[58] Field of Search ................................. 525/71, 73, 74, 525/78, 80, 83, 84

[56] References Cited

U.S. PATENT DOCUMENTS

| | | | |
|---|---|---|---|
| 4,009,226 | 2/1977 | Ott et al. | 525/71 |
| 4,009,227 | 2/1977 | Ott et al. | 525/71 |
| 4,224,419 | 9/1980 | Swoboda et al. | 525/71 |
| 4,567,233 | 1/1986 | Tomono et al. | 525/71 |
| 4,608,414 | 8/1986 | Kitsunai et al. | 525/71 |
| 4,652,614 | 3/1987 | Eichenauer et al. | 525/71 |
| 4,879,343 | 11/1989 | Aoki et al. | 525/71 |
| 5,075,363 | 12/1991 | Tsuda et al. | 525/71 |
| 5,091,470 | 2/1992 | Wolsink et al. | 525/71 |
| 5,200,441 | 4/1993 | Kim et al. | 525/71 |
| 5,270,387 | 12/1993 | Shields et al. | 525/71 |

FOREIGN PATENT DOCUMENTS

| | | |
|---|---|---|
| 0048059 | 3/1982 | European Pat. Off. . |
| 0074051 | 3/1983 | European Pat. Off. . |
| 0154244 | 9/1985 | European Pat. Off. . |
| 0186785 | 7/1986 | European Pat. Off. . |

OTHER PUBLICATIONS

Derwent Publications Ltd., Database File WPIL, AN 89-073440, JP-A-1 026 618, Jan. 1989.

*Primary Examiner*—Paul R. Michl
*Assistant Examiner*—Mark L. Warzel
*Attorney, Agent, or Firm*—Oblon, Spivak, McClelland, Maier & Neustadt, P.C.

[57] ABSTRACT

A rubber-reinforced styrene resin composition consisting essentially of:

(1) 2–30% by weight of a grafted rubbery polymer wherein less than 30 parts by weight of a polymer of at least an aromatic alkenyl compound and an alkenyl cyanide compound are grafted onto 100 parts by weight of a conjugated diene rubber (I) having a weight average particle size of 0.26–0.6 μm and a gel content of 30–80% by weight;

(2) 5–40% by weight of a grafted rubbery polymer wherein 30 parts by weight or more of a polymer of at least an aromatic alkenyl compound and an alkenyl cyanide are grafted onto 100 parts by weight of a conjugated diene rubber (II) having a weight average particle size of 0.26–0.6 μm and a gel content of 30–80% by weight; and (3) 40–93% by weight of a styrene copolymer of a monomer component consisting of at least one aromatic alkenyl compound and an alkenyl cyanide compound, and the difference between grafting degree of the component (1) and the grafting degree of component (2) being 15% by weight or more.

35 Claims, No Drawings

RUBBER-REINFORCED STYRENE RESIN COMPOSITION AND PROCESS FOR PRODUCING THE SAME

CROSS-REFERENCE TO RELATED APPLICATIONS

This application is a Continuation of application Ser. No. 08/123,118, filed on Sep. 20, 1993, now abandoned, which is a Continuation-in-Part of Ser. No. 07/853,269, filed on Mar. 18, 1992, now abandoned.

BACKGROUND OF THE INVENTION

The present invention relates to a rubber-reinforced styrene resin composition having excellent heat resistance, impact resistance and processability, as well as to a process for producing the composition.

Rubber-reinforced thermoplastic resins have excellent impact resistance, processability and surface gloss and are, therefore, used in various applications. However, when they are used as shaped articles such as interior trims of vehicles, the articles are required to have mat surface. Further, some other uses require that the said resins have heat resistance. The conventional methods of delustering shaped articles include a method in which an oxide of magnesium, calcium or the like is added. This method, however, has a drawback that the impact strength is greatly reduced and the gloss is not uniformly taken off. There is also a delustering method in which a rubbery elastomer is added. This method, however, brings about deterioration of mechanical properties (in particular, hardness and rigidity) of resin.

There is further known a delustering method in which a resin component three-dimensionally cross-linked with a crosslinking monomer is added. This method, however, is unable to give a uniformly delustered molded article and moreover reduces the processability of the resin.

Meanwhile, for the purpose of improving heat resistance, it is known to use α-methylstyrene as a comonomer or to add a maleimide copolymer. This approach, however, brings about a great reduction in processability and impact resistance.

SUMMARY OF THE INVENTION

The present invention has solved the above-mentioned problems of the prior art by providing a rubber-reinforced styrene resin composition having an excellent wetting effect and a good balance of heat resistance, processability and impact resistance.

According to the present invention, there are provided a rubber-reinforced styrene resin composition consisting essentially of:

(1) 2–30% by weight of a grafted rubbery polymer wherein 100 parts by weight of a rubbery polymer (I) is grafted with less than 30 parts by weight of a polymer (namely, the grafting degree being less than 30% by weight) of a monomer component (A) consisting of (a) 10–95% by weight of at least one aromatic alkenyl compound, (b) 1–60% by weight of at least one alkenyl cyanide compound and (c) 0–89% by weight of at least one other copolymerizable monomer [(a)+(b)+(c)= 100% by weight], said rubbery polymer (I) being a conjugated diene rubber having a weight average particle size of 0.26–0.6 μm and a gel content of 30–80% by weight, (2) 5–40% by weight of a grafted rubbery polymer wherein 100 parts by weight of a rubbery polymer (II) is grafted with 30 parts by weight or more of a polymer (namely, the grafting degree being at least 30% by weight) of a monomer component (A') consisting of (a') 10–95% by weight of at least one aromatic alkenyl compound, (b') 1–60% by weight of at least one alkenyl cyanide compound and (c') 0–89% by weight of at least one other copolymerizable monomer [(a')+(b')+(c')= 100% by weight], said rubbery polymer (II) being a conjugated diene rubber having a weight average particle size of 0.26–0.6 μm and a gel content of 30–80% by weight, and (3) 40–93% by weight of a styrene copolymer of a monomer component (A") consisting of (a") 10–95% by weight of at least one aromatic alkenyl compound, (b") 1–60% by weight of at least one alkenyl cyanide compound and (c") 0–89% by weight of at least one other copolymerizable monomer [(a")+(b")+(c")= 100% by weight] [(1)+(2)+(3)=100% by weight], the difference between the grafting degree of the component (1) and the grafting degree of the component (2) being 15% by weight or more; and a process for producing such a rubber-reinforced styrene resin composition.

DETAILED DESCRIPTION OF THE INVENTION

The rubbery polymers (I) and (II) used in the rubber-reinforced styrene resin composition of the present invention may be of the same kind or different kinds, and are preferably of the same kind. The rubbery polymers (I) and (II) include, for example, diene rubbery polymers such as polybutadiene, polyisoprene, styrene-butadiene random copolymer, acrylonitrile-butadiene copolymer, styrene-butadiene block copolymer and the like and, in view of the low-temperature impact resistance of the rubber-reinforced resin composition, conjugated diene rubbery polymers are more preferable. Polybutadiene and styrene-butadiene copolymer are most preferable. The rubbery polymers mentioned above can be used alone or in combination of two or more as the rubbery polymer (I) or (II).

The aromatic alkenyl compounds which are the components (a), (a') and (a") in the monomer components (A), (A') and (A"), respectively, include styrene, t-butylstyrene, α-methylstyrene, p-methylstyrene, divinylbenzene, 1,1-diphenylstyrene, N,N-diethyl-p-aminoethylstyrene, N,N-diethyl-p-aminoethylstyrene, vinylpyridine, vinylxylene, monochlorostyrene, dichlorostyrene, monobromostyrene, fluorostyrene, ethylstyrene, vinylnaphthalene, etc. Styrene and α-methylstyrene are particularly preferable. These aromatic alkenyl compounds can be used alone or in combination of two or more.

The alkenyl cyanide compounds which are the components (b), (b') and (b") in the monomer components (A), (A') and (A"), respectively, include acrylonitrile, methacrylonitrile, etc. Of these, acrylonitrile is particularly preferable. These alkenyl cyanide compounds can be used alone or in combination of two or more.

The other copolymerizable monomers which are the components (c), (c') and (c") in the monomer components (A), (A') and (A"), respectively, include acrylic acid esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate, benzyl acrylate and the like; methacrylic acid esters such as methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate, benzyl methacrylate and the like; unsaturated dicarboxylic acid anhydrides such as maleic anhydride, itaconic anhydride, citraconic anhydride and the like, unsaturated monocarboxylic acids such as acrylic acid, methacrylic acid and the like, maleimide compounds such as maleimide, N-methylmaleimide, N-butylmaleimide, N-(p-methylphenyl)maleimide, N-phenylmaleimide, N-cyclohexylmaleimide and the like, epoxy compounds such as glycidyl methacrylate and the like; and so forth. Incidentally, the maleimide compounds include those obtained by copolymerizing styrene or the like with, for example, maleic anhydride and imidizing the resulting copolymer with aniline or the like. These copolymerizable monomers can be used alone or in combination of two or more as components (c), (c') and (c"). Of these copolymerizable monomers, preferable are methyl methacrylate and maleimide compounds. In particular, the use of a maleimide compound is preferable because it gives a rubber-reinforced styrene resin composition well balanced in physical properties in respect of heat resistance and moldability.

The respective proportions of the aromatic alkenyl compounds (a), (a') and (a") in the monomer components (A), (A') and (A") used in the components (1) to (3) are 10–95% by weight, preferably 20–90% by weight. When the proportions are less than 10% by weight, the moldability of the resulting resin composition is inferior. When the proportions are more than 95% by weight, the heat resistance, chemical resistance and impact resistance of the resulting resin composition are inferior.

The respective proportions of the alkenyl cyanide compounds (b), (b') and (b") in the monomer components (A), (A') and (A") used in the components (1) to (3) are 1–60% by weight, preferably 5–55% by weight. When the proportions are less than 1% by weight, the chemical resistance of the resulting resin composition is inferior. When the proportions are more than 60% by weight, the moldability and heat stability during molding of the resulting resin composition are inferior.

The respective proportions of the other copolymerizable monomers (c), (c') and (c") in the monomer components (A), (A') and (A") used in the components (1) to (3) are 0–89% by weight, preferably 0–75% by weight. When the proportions are more than 89% by weight, the moldability, impact resistance and chemical resistance of the resulting resin composition are inferior.

The component (1) is a grafted rubbery polymer wherein the monomers (a), (b) and (c) are graft-polymerized directly onto the rubbery polymer (I). The weight average particle size of the rubbery polymer (I) is 0.26–0.6 μm, preferably 0.27–0.5 μm and more preferably 0.28–0.45 μm. The gel content of the rubbery polymer (I) is 30–80% by weight, preferably 40–75% by weight and more preferably 50–75% by weight. Incidentally, the gel content is determined as follows: A rubber sample is dissolved in toluene, the resulting solution is filtered through a 200-mesh screen to obtain the matter which does not pass the screen, which is called the gel component hereinafter, and the weight ratio of the gel comonent to the rubber sample is determined as the gel content. The grafting degree of this grafted rubbery polymer (i.e., the proportion of the graft-polymerized monomers to the rubber polymer) is less than 30% by weight, preferably 3–28% by weight, more preferably 5–25% by weight. When the grafting degree is more than 30% by weight, no matting effect as desired is obtained.

The component (2) is a grafted rubbery polymer wherein the monomers (a'), (b') and (c') are graft-polymerized directly onto the rubbery polymer (II). The weight average particle size of the rubbery polymer (II) is 0.26–0.6 μm, preferably 0.27–0.5 μm and more preferably 0.28–0.45 μm, and the gel content of the rubbery polymer (II) is 30–80% by weight, preferably 40–75% by weight, and more preferably 50–75% by weight. The grafting degree of the grafted rubbery polymer is 30–250% by weight, preferably 35–200% by weight, more preferably 40–120% by weight. When the grafting degree is less than 30% by weight, impact resistance is unsatisfactory. The ratio of the weight average particle size of the rubbery polymer (I) to that of the rubbery polymer (II) is preferably 0.5–2.0, more preferably 0.8–1.5 and most preferably 0.9–1.2. A ratio of about 1 is especially preferable in view of the matting effect, no uneven gloss and the like.

The component (3) is a styrene polymer other than the above-mentioned grafted rubbery polymers (1) and (2), and is composed of copolymers (free from rubbery polymer) obtained as by-products in the production of the components (1) and (2) and/or polymers produced separately.

The difference between the grafting degree of the component (1) and the grafting degree of the component (2) is preferably 15% by weight or more, more preferably 20% by weight or more, particularly preferably 25% by weight or more. The difference is most preferably 30% or more.

When the difference between the grafting degree of the component (1) and the grafting degree of the component (2) falls within the above range, the resulting resin composition has an excellent matting effect and a good physical property balance in respect of impact resistance, chemical resistance, heat stability and moldability.

The proportion of the component (1) in the rubber-reinforced styrene resin composition of the present invention is 2–30% by weight, preferably 3–25% by weight, more preferably 5–23% by weight, particularly preferably 8–21% by weight. When the proportion of the component (1) is less than 2% by weight, no sufficient matting effect is obtained. When the proportion is more than 30% by weight, the moldability is unsatisfactory.

The proportion of the component (2) in the rubber-reinforced styrene resin composition of the present invention is 5–40% by weight, preferably 7–35% by weight, more preferably 8–30% by weight, particularly preferably 10–25% by weight. When the proportion of the component (2) is less than 5% by weight, no sufficient impact resistance is obtained. When the proportion is more than 40% by weight, the moldability is unsatisfactory.

The proportion of the component (3) in the rubber-reinforced styrene resin composition of the present invention is 30–93% by weight, preferably 50–90% by weight. When the proportion of the component (3) is less than 40% by weight, the moldability is unsatisfactory. When the proportion is more than 93% by weight, the impact resistance is unsatisfactory.

The rubber-reinforced styrene resin composition of the present invention contains the components (1) to (3) as essential components. The present resin composition has a better physical property balance in respect of heat resistance, moldability and impact resistance (such a resin composition is referred to hereinafter as "preferable rubber-reinforced styrene rein" in some cases) when the component (3), i.e. the styrene polymer, is a copolymer of a monomer component (A") consisting of (a") 10–95% by weight, preferably 20–90% by weight of at least one aromatic alkenyl compound, (b") 1–60% by weight, preferably 5–55% by weight of at least one alkenyl cyanide compound, (c"–1) 0.5–50% by weight, preferably 1–40% by weight of at least one maleimide compound and (c"–2) 0–88.5% by weight, preferably 0–64.5% by weight of at least one other copolymerizable monomer [(a")+(b")+(c"–1)+(c"–2)=100% by weight]. The maleimide compound (c"–1) may also be the maleimide component in a copolymer obtained by copolymerizing maleic anhydride with a copolymerizable monomer such as styrene or the like and imidizing the copolymer obtained with aniline or the like.

The rubber-reinforced styrene resin composition of the present invention consisting essentially of the components (1) to (3) can be produced by, for example, the typical production process mentioned below. The composition can be produced by compounding the following components (1') and (2'), the following components (1') to (3') or the following components (1') to (4'). The components (1') to (4') are compounded in such proportions that the grafting degrees, rubbery polymer contents, monomer compositions and compounding proportions of the components (1) to (3) fall within the respective ranges specified.

The rubber-reinforced styrene resin composition of the present invention is typically produced by a process comprising compounding:

(1') 5–40% by weight, preferably 7–35% by weight, of a graft copolymer obtained by graft-polymerizing, in the presence of 5–80 parts by weight, preferably 10–65 parts by weight, of a rubbery polymer (I), 95–20 parts by weight, preferably 90–35 parts by weight, of a monomer component (A) consisting of (a) 10–95% by weight, preferably 20–80% by weight, of at least one aromatic alkenyl compound, (b) 1–60% by weight, preferably 5–50% by weight, of at least one alkenyl cyanide compound and (c) 0–89% by weight, preferably 0–75% by weight, of at least one other copolymerizable monomer [(a)+(b)+(c)=100% by weight] [(I)+(A)=100 parts by weight], the grafting degree of the grafted rubbery polymer contained in the graft copolymer being less than 30% by weight, (2') 5–80% by weight, preferably 10–70% by weight, of a graft copolymer obtained by graft-polymerizing, in the presence of 5–80 parts by weight, preferably 10–65 parts by weight, of a rubbery polymer (II), 95–20 parts by weight, preferably 90–35 parts by weight, of the monomer component (A') consisting of (a') 10–95% by weight, preferably 20–80% by weight, of at least one aromatic alkenyl compound, (b') 1–60% by weight, preferably 5–50% by weight, of at least one alkenyl cyanide compound and (c') 0–89% by weight, preferably 0–75% by weight, of at least one other copolymerizable monomer [(a')+(b')+(c')=100% by weight] [(II)+(A)=100 parts by weight], the grafting degree of the grafted rubbery polymer contained in the graft copolymer being 30% by weight or more, (3') 0–60% by weight, preferably 5–55% by weight, more preferably 10–50% by weight, of a styrene polymer obtained by copolymerizing a monomer component (A") consisting of (a") 10–95% by weight, preferably 20–80% by weight, of at least one aromatic alkenyl compound, (b") 0–60% by weight, preferably 1–50% by weight, of at least one alkenyl cyanide compound, (c"–1) 0.5–80% by weight, preferably 10–70% by weight, more preferably 15–60% by weight of at least one maleimide compound and (c"–2) 0–80% by weight, preferably 0–75% by weight, of at least one other copolymerizable monomer [(a")+(b")+(c"–1)+(c"–2)=100% by weight], and (4') 0–60% by weight, preferably 0–50% by weight, of a styrene polymer obtained by copolymerizing a monomer component (A''') consisting of (a''') 10–95% by weight, preferably 20–80% by weight, of at least one aromatic alkenyl compound, (b''') 1–60% by weight, preferably 5–50% by weight, of at least one alkenyl cyanide compound and (c''') 0–89% by weight, preferably 0–75% by weight, of at least one other copolymerizable monomer [(a''')+(b''')+(c''')=100% by weight] [(1')+(2')+(3')+(4')=100% by weight].

The grafting degree and the content of grafted rubbery polymer in the graft copolymer are values obtained in the following manner:

One part by weight of a graft copolymer was placed in 20 parts by weight of acetone; the mixture was stirred at 25° C. for 48 hours and then separated into an insoluble portion (dry weight=W) and a soluble portion (dry weight=X) using a centrifuge. Using the data obtained, the grafting degree and the grafted rubbery polymer content were determined from the following equations:

Grafting degree (% by weight)=[(W–R)/R]×100 (R is a weight of a rubbery polymer before being subjected to grafting [i.e. rubbery polymer (I) or (II)], calculated from polymerization recipe for graft copolymer.)

Content of grafted rubbery polymer (% by weight)=[W/(W+X)]×100 (The grafted rubbery polymer refers to the above insoluble portion.)

In the process of the present invention, the rubbery polymers (I) and (II) used in the components (1') and (2') may be respectively the same as the rubbery polymers (I) and (II) in the components (1) and (2).

Also, the monomers constituting the monomer components (A) to (A''') used in the components (1') to (4') may be the same as the monomers in the components (1) to (3). The monomer components (A) to (A''') of the components (1') to (4') may be different from one another in respect of monomer type and proportion; but the monomer components of the components (1'), (2') and (4') and/or the components (2') and (4') are preferably the same as or similar to one another in respect of monomer type and proportion and, in particular, the monomer components of the components (1') and (2') are preferably the same as or similar to each other in respect of monomer type and proportion..

The component (3) (styrene polymer) used in the preferable rubber-reinforced styrene resin and the components (3') and (4') (styrene polymers) desirably have a molecular weight distribution (the ratio of weight-average molecular weight (Mw)/number-average molecular weight (Mn) determined from the calibration curve of standard polystyrene obtained by a gel permeation chromatography) of preferably 3.5 or less, more preferably 3.2–1.1 and a number-average molecular weight of preferably $3\times10^4$ to $15\times10^4$, more preferably $5\times10^4$ to $12\times10^4$ because the resulting resin composition has an excellent physical property balance in respect of impact resistance and moldability.

The number average molecular weights of the maleimide copolymers used as the component (3) or the component (3') are preferably $3\times10^4$ to $15\times10^4$, more preferably $5\times10^4$ to $10\times10^4$.

The intrinsic viscosity [] of the methyl ethyl ketone-soluble portion of each of the components (3), (1') and (2') is preferably 0.2 to 0.8 dl/g, more preferably 0.3 to 0.6 dl/g.

When these conditions are met, the physical balance in respect of imapct resistance, low-temperature impact resistance and moldability becomes better. In addition, such an advantage is obtained that the surface of a molded article is evenly matted and has no uneven gloss. Said no uneven gloss means that the gloss is uniform and is evaluated as follows: Injection molding is effected using a flat plate die whose surface has been embossed, the gloss at a position in the vicinity of the gate (resin-inlet) (referred to hereinafter "at the gate side position") and the gloss at a position 150 mm distant from the gate (referred to hereinafter as "at the distant position"), and the ratio of the gloss at the distant position to the gloss at the gate side position is determined. The closer to 1 this ratio, the more uniform the gloss.

The rubber-reinforced styrene resin composition of the present invention can be subjected to injection molding, extrusion molding, vacuum forming, profile molding, expansion molding, etc. to obtain automobile parts, electrical parts, household goods, various parts for industrial use, etc. In the above molding, it is possible to add conventional additives such as antioxidant, ultraviolet absorber, lubricant, flame retardant, antistatic agent, foaming agent, glass fiber, and other polymers such as polyamide, polycarbonate, thermoplastic polyester, polyphenylene ether, polyvinylidene fluoride resin, diene rubber, ethylene-propylene rubber, acrylic rubber and the like.

The present invention is more specifically explained below referring to Examples. However, the Examples are merely by way of illustration and not by way of limitation.

In the Examples, parts and % are by weight unless otherwise specified.

In the Examples, measurements of properties were effected as follows.

Izod impact strength

Measured in accordance with ASTM D 256 (6 mm thickness, notched). The unit is kgf/cm².

Melt flow rate

Measured in accordance with ASTM D 1238 (220° C., 10 kg). The unit is g/10 min.

Heat deformation temperature

Measured in accordance with ASTM D 648 (12 mm thickness, 18.6 kgf/cm). The unit is °C.

Surface gloss (gloss value)

Measured using a gloss meter (incident light=60° C., reflected light=60°). The unit is %.

REFERENCE EXAMPLE 1

[Preparation of rubber-reinforced resin (1)]

| Mixture (I) recipe | |
| --- | --- |
| Polybutadiene latex (weight average particle size: 0.35 μm; gel content: 75%) (solid content) | 60 parts |
| Styrene | 11 parts |
| Acrylonitrile | 2 parts |
| t-Dodecyl mercaptan | 0.3 parts |
| Potassium rosinate | 0.25 parts |
| Potassium hydroxide | 0.005 parts |
| Deionized water | 100 parts |

The above mixture (I) was fed to a reactor provided with a jacket and a stirrer. The air inside the reactor was replaced with a nitrogen gas. The temperature of the contents of the reactor was elevated to 50° C. while the jacket temperature was kept at 70° C. Thereto were added a solution of 0.3 part of sodium ethylenediaminetetraacetate dihydrate, 0.35 part of sodium sulfoxylate formaldehyde dihydrate and 0.01 part of ferrous sulfate in 10 parts of water and 0.1 part of cumene hydroperoxide. The resulting mixture was subjected to reaction.

After one hour from the start of the reaction, the following mixture (II) was added continuously in 2 hours, during which the reaction was continued.

| Mixture (II) recipe | |
| --- | --- |
| Styrene | 19 parts |
| Acrylonitrile | 8 parts |
| t-Dodecyl mercaptan | 0.5 parts |
| Potassium rosinate | 1.0 parts |
| Potassium hydroxide | 0.02 parts |
| Cumene hydroperoxide | 0.15 parts |
| Deionized water | 50 parts |

By the above polymerization was obtained a rubber-reinforced resin (a graft copolymer, the term "rubber-reinforced resin" is hereinafter used in the same meaning) [referred to hereinafter as the rubber reinforced resin (1)], as the component (1'). Constitution of 100 parts of the rubber-reinforced resin (1):

| | |
| --- | --- |
| Component (1) [rubbery polymer (I), grafting degree = 13%] | 67.8 parts |
| Component (3) (styrene-acrylonitrile copolymer) | 32.2 parts |

REFERENCE EXAMPLE 2

[Preparation of rubber-reinforced resin (2)]

In the presence of 55 parts of a polybutadiene (weight average particle size; 0.35 μm; gel content: 75%), 30 parts of styrene and 15 parts of acrylonitrile were graft-polymerized in the same manner as in the production of the rubber-reinforced resin (1), to obtain a rubber-reinforced resin [referred to hereinafter as the rubber-reinforced resin (2)] as the component (2'). Constitution of 100 parts of the rubber-reinforced resin (2):

| | |
| --- | --- |
| Component (1) [rubbery polymer (I), grafting degree = 22%] | 67.1 parts |
| Component (3) (styrene-acrylonitrile copolymer) | 32.9 parts |

REFERENCE EXAMPLE 3

[Preparation of rubber-reinforced resin (3)]

| Mixture (I) recipe | |
| --- | --- |
| Polybutadiene latex (weight average particle size: 0.35 μm; gel content: 75%) (solid content) | 40 parts |
| Styrene | 14 parts |
| Acrylonitrile | 4 parts |
| t-Dodecyl mercaptan | 0.1 parts |
| Potassium rosinate | 0.25 parts |
| Potassium hydroxide | 0.005 parts |
| Deionized water | 100 parts |

The above mixture (I) was fed to a reactor provided with a jacket and a stirrer. The air inside the reactor was replaced with a nitrogen gas. The temperature of the contents inside the reactor was elevated to 50° C. while the jacket temperature was kept at 70° C. Thereto were added a solution of 0.3 part of sodium pyrophosphate, 0.35 part of dextrose and 0.01 part of ferrous sulfate in 10 parts of water and 0.1 part of cumene hydroperoxide. The resulting mixture was subjected to reaction.

After one hour from the start of the reaction, the following mixture (II) was added continuously in 5 hours, after which the reaction was continued for 1 hour with stirring.

| Mixture (II) recipe | |
|---|---|
| Styrene | 28 parts |
| Acrylonitrile | 12 parts |
| t-Dodecyl mercaptan | 0.2 parts |
| Potassium rosinate | 1.0 parts |
| Potassium hydroxide | 0.02 parts |
| Cumene hydroperoxide | 0.15 parts |
| Deionized water | 50 parts |

By the above polymerization was obtained a rubber-reinforced resin [referred to hereinafter as the rubber-reinforced resin (3)] as the component (2'). Constitution of 100 parts of the rubber-reinforced resin (3):

| Component (2) [rubbery polymer (II), grafting degree = 43%] | 57.2 parts |
|---|---|
| Component (3) (styrene-acrylonitrile copolymer) | 42.8 parts |

REFERENCE EXAMPLE 4

[Preparation of rubber-reinforced resin (4)]

In the presence of 40 parts of a polybutadiene (weight average particle size; 0.35 μm; gel content: 75%), 45 parts of styrene and 15 parts of acrylonitrile were graft-polymerized in the same manner as in the production of the rubber-reinforced resin (3), to obtain a rubber-reinforced resin [referred to hereinafter as the rubber-reinforced resin (4)] as the component (2'). Constitution of 100 parts of the rubber-reinforced resin (4):

| Component (2) [rubbery polymer (II), grafting degree = 75%] | 70.0 parts |
|---|---|
| Component (3) (styrene-acrylonitrile copolymer) | 30.0 parts |

REFERENCE EXAMPLE 5

[Preparation of Copolymer (1)]

Into a reactor provided with a jacket and a stirrer were charged 50 parts of toluene, 70 parts of styrene, 30 parts of acrylonitrile and 0.1 part of t-dedecylmercaptan, and the air inside the reactor was replaced with a nitrogen gas, after which the internal temperature was elevated to 140° C., at which temeprature the mixture was subjected to reaction for 4 hours. The toluene and unreacted monomers were removed by steam stripping to recover a copolymer (a styrene copolymer) (hereinafter, the term "copolymer" is used in the same meaning) as the component (4').

Molecular weight distribution=3.1

Number-average molecular weight=8.5×10$^4$

REFERENCE EXAMPLE 6

[Preparation of copolymer (2)]

Into a reactor provided with a jacket and a stirrer were charged 100 parts of a toluene/methyl ethyl ketone (50%/50%) mixture, 50 parts of styrene, 50 parts of N-phenylmaleimide, 0.1 part of benzoyl peroxide and 0.1 part of t-dodecylmercaptan, and the air inside the reactor was replaced with a nitrogen gas, after which the internal temperature was elevated to 85° C., at which temperature the mixture was subjected to reaction for 3 hours. The toluene and unreacted monomers were removed by steam stripping to recover a copolymer as the component (3').

Molecular weight distribution=2.9

Number-average molecular weight=6.8×10$^4$

REFERENCE EXAMPLE 7

[Preparation of copolymer (3)]

The same procedure as in Reference Example 6 was repeated, except that 40 parts of styrene, 50 parts of N-phenylmaleimide and 10 parts of acrylonitrile were substituted for the 50 parts of styrene and 50 parts of N-phenylmaleimide and the t-dodecylmercaptan was not used, to obtain a copolymer as the component (3').

Molecular weight distribution=2.7

Number-average molecular weight=8.2×10$^4$

REFERENCE EXAMPLE 8-15

[Preparation of rubber-reinforced resins (5) to (12)]

In the same manner as in Reference Example 1, rubber-reinforced resins were prepared using the rubbery polymers shown in Table 1.

TABLE 1

| Reference Example No. | Rubber-reinforced resin No. | Particle size of rubbery polymer* (wt. average) (μm) | Gel content of rubbery polymer (wt. %) | Grafting degree (wt. %) |
|---|---|---|---|---|
| 8 | (5) | 0.09 | 80 | 65 |
| 9 | (6) | 0.60 | 35 | 25 |
| 10 | (7) | 0.1 | 80 | 40 |
| 11 | (8) | 0.25 | 90 | 23 |
| 12 | (9) | 0.25 | 90 | 65 |
| 13 | (10) | 0.3 | — | 18 |
| 14 | (11) | 0.3 | — | 39 |
| 15 | (12) | 0.1 | — | 43 |

Note: *: In Reference Examples 13–15, a copolymer consisting of 98% of butyl acrylate and 2% of tricyclododecenyl acrylate was used as the rubbery polymer.

EXAMPLES 1–9 AND COMPARATIVE EXAMPLES 1–13

The rubber-reinforced resins and copolymers prepared in the Reference Examples were mixed using a Henschel mixer, according to the compounding recipes shown in Tables 2 and 3. Each of the resulting mixtures was melt-mixed at a resin temperature of 230°–250° C. using a vented extruder and extruded therethrough to prepare pellets. The pellets were dried at 90° C. The dried pellets were subjected to injection molding at 230° C. and each molded article was measured for physical properties.

The results obtained are shown in Tables 2, 3 and 4.

TABLE 2

|  | Example |  |  |  |  |  |  |  |  |
|---|---|---|---|---|---|---|---|---|---|
|  | 1 | 2 | 3 | 4 | 5 | 6 | 7 | 8 | 9 |
| Compounding recipe (parts) | | | | | | | | | |
| Rubber-reinforced resin (1) (weight average particle size: 0.35 μm; gel content: 75%; grafting degree: 13%) [Component (1) 6.78% + component (3) 32.2%] | 20 | — | 30 | — | — | — | — | 35 | — |
| Rubber-reinforced resin (2) (weight average particle size: 0.35 μm; gel content: 75%; grafting degree: 22%) [Component (1) 67.1% + component (3) 32.9% | — | 20 | — | 15 | 10 | 40 | 5 | — | 30 |
| Rubber-reinforced resin (3) (weight average particle size: 0.35 μm; gel content: 75%; grafting degree: 43%) [Component (2) 57.2% + component (3) 42.8%] | 30 | — | — | 20 | — | — | 40 | — | 40 |
| Rubber-reinforced resin (4) (weight average particle size: 0.35 μm; gel content: 75% grafting degree: 75%) [Component (2) 70.0% + component (3) 30.0%] | — | 30 | 30 | 25 | 55 | 43 | — | 10 | — |
| Copolymer (1) [Component (4') 100%] | 30 | 20 | 20 | — | 15 | — | 45 | 35 | 30 |
| Copolymer (2) [Component (3') 100%] | 20 | — | — | 40 | 20 | 17 | 10 | — | — |
| Copolymer (3) [Component (3') 100%] | — | 30 | 20 | — | — | — | — | 20 | — |
| Composition of rubber-reinforced styrene resin (Product) (Parts) | | | | | | | | | |
| Component (1) | 13.6 | 13.4 | 20.3 | 10.1 | 6.7 | 26.8 | 3.4 | 23.7 | 20.1 |
| Component (2) | 17.2 | 21.0 | 21.0 | 28.9 | 38.5 | 30.1 | 22.9 | 7.0 | 22.9 |
| Component (3) | 69.2 | 65.6 | 58.7 | 61.0 | 54.8 | 43.1 | 73.7 | 69.3 | 57.0 |
| Physical Properties | | | | | | | | | |
| Izod impact strength | 23 | 18 | 20 | 16 | 38 | 33 | 17 | 15 | 25 |
| Melt flow rate | 11 | 9 | 14 | 8 | 5 | 6 | 18 | 16 | 19 |
| Heat deformation temperature | 106 | 112 | 107 | 118 | 101 | 100 | 97 | 108 | 91 |
| Surface gloss value | 38 | 41 | 35 | 44 | 48 | 29 | 58 | 33 | 37 |
| Uniformity of gloss | | | | | | | | | |
| Gloss at the distant position/gloss at the gate side position | 2.4/1.8 | 2.7/1.9 | 2.1/1.6 | 2.9/2.1 | 3.1/2.2 | 2.0/1.4 | 3.8/2.7 | 2.0/1.5 | 2.2/1.6 |
| (Ratio) | 1.33 | 1.42 | 1.31 | 1.38 | 1.41 | 1.43 | 1.41 | 1.33 | 1.38 |
| Visual evaluation* | o | o | o | o | o | o | o | o | o |

Note: *: o: No uneven gloss Δ: A little uneven gloss x: Uneven gloss

TABLE 3

|  | Comparative Example |  |  |  |  |  |  |  |
|---|---|---|---|---|---|---|---|---|
|  | 1 | 2 | 3 | 4 | 5 | 6 | 7 | 8 |
| Compounding recipe (Parts) | | | | | | | | |
| Rubber-reinforced resin (1)** | 1.5 | 30 | 50 | 1.5 | 10 | 10 | — | — |
| Rubber-reinforced resin (2)** | — | — | — | — | — | — | — | — |
| Polybutadiene latex (Non-grafted rubber, solid content) | — | — | — | — | — | — | 20 | — |
| Rubber-reinforced resin (3)** | 30 | 5 | 10 | 5 | — | — | — | 40 |
| Rubber-reinforced resin (4)** | — | — | — | — | 70 | 90 | 30 | — |
| Copolymer (1) [Component (4') 100%] | 48.5 | 45 | 20 | 67 | 20 | — | 30 | 30 |
| Copolymer (2) [Component (3') 100%] | 20 | 20 | 20 | 20 | — | — | — | — |
| Copolymer (3) [Component (3') 100%] | — | — | — | — | — | — | 30 | 30 |
| Composition of rubber-reinforced styrene resin (Product) (parts) | | | | | | | | |
| Component (1) | 1.0 | 20.3 | 33.9 | 1.0 | 6.8 | 6.8 | (20) | 0 |
| Component (2) | 17.2 | 2.9 | 5.7 | 2.9 | 49.0 | 63.0 | 21 | 22.9 |
| Component (3) | 81.8 | 76.8 | 60.4 | 96.1 | 44.2 | 30.2 | 59 | 77.1 |
| Properties | | | | | | | | |
| Izod impact strength | 14 | 7 | 19 | 5 | 43 | 49 | 11 | 15 |
| Melt flow rate | 16 | 19 | 2 | 30 | 0.3 | * | 16 | 10 |
| Heat deformation temperature | 107 | 106 | 105 | 109 | 80 | 78 | 106 | 113 |

TABLE 3-continued

|  | Comparative Example | | | | | | | |
|---|---|---|---|---|---|---|---|---|
|  | 1 | 2 | 3 | 4 | 5 | 6 | 7 | 8 |
| Surface gloss value | 82 | 33 | 31 | 84 | 53 | 48 | 32 | 88 |
| Uniformity of gloss |  |  |  |  |  |  |  |  |
| Gloss at the distant position/gloss at the gate side position | 6.8/4.5 | 2.0/1.2 | 1.9/0.8 | 6.9/4.7 | 4.6/3.2 | 4.3/3.0 | 2.1/0.9 | 7.1/4.9 |
| (Ratio) | (1.51) | (1.67) | (2.38) | (1.47) | (1.44) | (1.43) | (2.33) | (1.45) |
| Visual evaluation*** | o | Δ | x | o | o | o | x | o |

Note: *means "impossible to measure".
**: The resins are the same as in Table 2.
***: o, Δ and x have the same meanings as in Table 2.

TABLE 4

|  | Comparative Example | | | | |
|---|---|---|---|---|---|
|  | 9 | 10 | 11 | 12* | 13* |
| Compounding recipe (parts) |  |  |  |  |  |
| Rubber-reinforced resin (1) (weight average particle size: 0.35 μm; gel content: 75%; grafting degree: 13%) [Component (1) 6.78% + Component (3) 32.2%] | 20 | — | — | — | — |
| Rubber-reinforced resin (5) (weight average particle size: 0.09 μm; gel content: 80%; grafting degree: 65%) [Component (2) 66% + Component (3) 34%] | 30 10 | — | — | — | — |
| Rubber-reinforced resin (6) (weight average particle size: 0.60 μm; gel content: 35%; grafting degree: 25%) [Component (1) 62.5% + Component (3) 37.5%] | — | 20 | — | — | — |
| Rubber-reinforced resin (7) (weight average particle size: 0.1 μm; gel content: 80%; grafting degree: 40%) [Component (2) 57.2% + Component (3) 42.8%] | — | 30 | — | — | — |
| Rubber-reinforced resin (8) (weight average particle size: 0.25 μm; gel content: 90%; grafting degree: 23%) [Component (1) 61.5% + Component (3) 38.5%] | — | — | 20 | — | — |
| Rubber-reinforced resin (9) (weight average particle size: 0.25 μm; gel content: 90%; grafting degree: 65%) [Component (2) 82.5% + Component (3) 17.5%] | — | — | 30 | — | — |
| Rubber-reinforced resin (10) (weight average particle size: 0.3 μm; grafting degree: 18%) [Component (1) 41.3% + Component (3) 58.7%] | — | — | — | 30 | 30 |
| Rubber-reinforced resin (11) (weight average particle size: 0.3 μm; grafting degree: 39%) [Component (1) 48.7% + Component (3) 51.3%] | — | — | — | 30 | — |
| Rubber-reinforced resin (12) (weight average particle size: 0.1 μm; grafting degree: 43%) [Component (1) 50.1% + Component (3) 49.9%] | — | — | — | — | 30 |
| Copolymer (1) | 30 | 30 | 30 | 20 | 20 |
| Copolymer (2) | 20 | 20 | 20 | 20 | 20 |
| Composition of rubber-reinforced styrene resin (Product) (Parts) |  |  |  |  |  |
| Component (1) | 13.6 | 12.5 | 12.3 | 12.4 | 12.4 |
| Component (2) | 19.8 | 17.2 | 24.5 | 14.6 | 15.0 |
| Component (3) | 66.6 | 70.2 | 62.9 | 73.0 | 72.6 |

TABLE 4-continued

|  | Comparative Example | | | | |
|---|---|---|---|---|---|
|  | 9 | 10 | 11 | 12* | 13* |
| Physical properties | | | | | |
| Izod impact strength { 23° C. | 19 | 21 | 16 | 17 | 15 |
| −30° C. | — | — | — | 3 | 3 |
| Melt flow rate | 13 | 9 | 10 | 15 | 13 |
| Heat deformation temperature | 105 | 103 | 105 | 105 | 105 |
| Surface gloss value | 79 | 55 | 65 | 52 | 79 |
| Uniformity of gloss | | | | | |
| Gloss at the distant position | 6.6 | 4.4 | 5.2 | 4.0 | 6.8 |
| Gloss at the gate side position | 4.2 | 2.0 | 4.0 | 1.9 | 4.5 |
| Ratio of the former/the latter | 1.57 | 2.2 | 1.30 | 2.1 | 1.51 |
| Visual evaluation** | o | x | o | x | o |

Note:
*: Rubber was acrylic rubber as shown in Table 1.
**: o and x have the same meanings as in Table 2.

As is clear from Table 2, the rubber-reinforced styrene resins of Examples 1 to 9 according to the present invention are good in matting effect and excellent in heat resistance, moldability and impact strength.

Meanwhile, as is clear from Table 3, the rubber-reinforced styrene resins of Comparative Examples 1 and 8 contain the component (1) in an amount smaller than the range specified in the present invention, and are strikingly inferior in matting effect. The rubber-reinforced styrene resin of Comparative Example 2 contains the component (2) in an amount smaller than the range specified in the present invention and is inferior in impact resistance. The rubber-reinforced styrene resin of Comparative Example 3 contains the component (1) in an amount larger than the range specified in the present invention and is inferior in moldability. The rubber-reinforced styrene resin of Comparative Example 4 contains the component (3) in an amount larger than the range specified in the present invention and is inferior in impact resistance and matting effect. The rubber-reinforced styrene resin of Comparative Example 5 contains the component (2) in an amount larger than the range specified in the present invention and is inferior in moldability. The rubber-reinforced styrene resin of Comparative Example 6 contains the component (3) in an amount larger than the range specified in the present invention and is inferior in moldability. In the resin of Comparative Example 7, the component (1) in the rubber-reinforced styrene resin of the present invention is replaced with a polybutadiene latex (a non-grafted rubber), and the resin of Comparative Example 7 is inferior in Izod impact strength.

Conventional rubber-reinforced styrene resins have had the problems that the surface gloss is not uniformly taken off and the physical property balance in respect of impact resistance, moldability and heat resistance is inferior. Meanwhile, in the rubber-reinforced styrene resin composition of the present invention, the surface gloss is uniformly taken off and the physical property balance in respect of impact resistance, moldability and heat resistance is excellent, and therefore, the resin composition has a high industrial value.

Comparative Examples 9, 11 and 13 show that the gloss is not sufficiently taken off, and Comparative Examples 10 and 12 show uneven gloss.

What is claimed is:

1. A rubber-reinforced styrene resin composition consisting essentially of:

(1) 2–30% by weight of a grafted rubbery polymer having grafting degree of 5 to 25% by weight wherein 5–25 parts by weight of a polymer of a monomer component (A) consisting of (a) 10–95% by weight of at least one aromatic alkenyl compound, (b) 1–60% by weight of at least one alkenyl cyanide compound and (c) 0–89% by weight of at least one other copolymerizable monomer, in which (a)+(b)+(c)=100% by weight, is grafted onto 100 parts by weight of a rubbery polymer (I) which is a conjugated diene rubber having a weight average particle size of 0.28–0.45 μm and a gel content of 40–75% by weight;

(2) 5–40% by weight of a grafted rubbery polymer having a grafting degree of 40–120% by weight wherein 40–120 parts by weight of a polymer of a monomer component (A') consisting of (a') 10–95% by weight of at least one aromatic alkenyl compound, (b') 1–60% by weight of at least one alkenyl cyanide compound and (c') 0–89% by weight of one other copolymerizable monomer in which (a')+(b')+(c')=100% by weight, is grafted onto 100 parts by weight of a rubbery polymer (II) which is a conjugated diene rubber having a weight average particle size of 0.28–0.45 μm and a gel content of 40–75% by weight; and (3) 40–93% by weight of a styrene copolymer of a monomer component (A") consisting of (a") 10–95% by weight of at least one aromatic alkenyl compound, (b") 1–60% by weight of at least one alkenyl cyanide compound and (c") 0–89% by weight of at least on other copolymerizable monomer, in which (a")+(b")+(c")=100% by weight, said styrene copolymer having an intrinsic viscosity of 0.2–0.8 dl/g as measured at 25° C. in methyl ethyl ketone, wherein (1)+(2)+(3)=100% by weight; the difference between the grafting degree of the component (1) and the grafting degree of the component (2) is 20% by weight or more; and the ratio of the particle size of the component (1) to that of the component (2) is 0.9–1.2.

2. The rubbers-reinforced styrene resin composition according to claim 1, wherein the ratio of the component (1)/the component (2)/the component (3) is 3–25/7–35/50–90% by weight.

3. The rubber-reinforced styrene resin composition according to claim 1, wherein the ratio of the component (1)/the component (2)/the component (3) is 8–21/10–25/50–82% by weight.

4. The rubber-reinforced styrene resin composition according to claim 1, wherein the ratio of the component (a)/the component (b)/the component (c) in the monomer component (A), the ratio of the component (a')/the component (b')/the component (c') in the monomer component (A') and the ratio of the component (a")/the component (b")/the component (c") in the monomer component (A") are each 20–90/5–55/0–75% by weight.

5. The rubber-reinforced styrene composition according to claim 1, wherein the component (3) is a styrene copolymer of a monomer component (A") consisting of (a") at least one aromatic alkenyl compound, (b") at least one alkenyl cyanide compound, (c"–1) at least one maleimide compound and (c"–2) at least one other copolymerizable monomer, and the ratio of the component (a")/the component (b")/the component (c"–1)/the component (c"–2) in the component (3) is 10–95/1–60/0.5–50/0–88.5% by weight.

6. The rubber-reinforced styrene resin composition according to claim 5, wherein the ratio of the component (a")/the component (b")/the component (c"–1)/the component (c"–2) in the component (3) is 20–90/5–55/1–40/0–64.5% by weight.

7. The rubber-reinforced styrene resin composition according to claim 1, wherein the molecular weight distribution Mw/Mn of the component (3) is 1.1–3.2.

8. The rubber-reinforced styrene resin composition according to claim 1, wherein the number-average molecular weight (polystyrene-reduced Mw) of the component (3) is $3 \times 10^4$–$15 \times 10^4$.

9. The rubber-reinforced styrene resin composition according to claim 1, wherein the intrinsic viscosity of the component (3) as measured at 25° C. in methyl ethyl ketone is 0.3–0.6 dl/g.

10. The rubber-reinforced styrene resin composition according to claim 1, wherein the aromatic alkenyl compound of each of the monomer components (A), (A') and (A") is at least one member selected from the group consisting of styrene, t-butylstyrene, α-methylstyrene, p-methylstyrene, N,N-diethyl-p-methylstyrene, divinylbenzene, N,N-diethyl-p-aminoethylstyrene, vinylpyridine, vinylxylene, monochlorostyrene, dichlorostyrene, monobromostyrene, fluorostyrene, ethylstyrene and vinylnaphthalene.

11. The rubber-reinforced styrene resin composition according to claim 1, wherein the aromatic alkenyl compound of each of the monomer components (A), (A') and (A") is at least one member selected from the group consisting of styrene and α-methylstyrene.

12. The rubber-reinforced styrene resin composition according to claim 1, wherein the alkenyl cyanide compound of each of the monomer components (A), (A') and (A") is at least one member selected from the group consisting of acrylonitrile and methacrylonitrile.

13. The rubber-reinforced styrene resin composition according to claim 1, wherein the at least one other copolymerizable monomer of each of the monomer components (A), (A') and (A") is selected from the group consisting of acrylic acid esters, methacrylic acid esters, unsaturated dicarboxylic acid anhydrides, unsaturated monocarboxylic acids, maleimide compounds and epoxy compounds.

14. The rubber-reinforced styrene resin composition according to claim 13, wherein the acrylic acid esters are selected from the group consisting of methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate and benzyl acrylate, the methacrylic acid esters are selected from the group consisting of methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate, the unsaturated dicarboxylic acid anhydrides are selected from the group consisting of maleic anhydride, itaconic anhydride and citraconic anhydride, the unsaturated monocarboxylic acids are selected from the group consisting of acrylic acid and methacrylic acid, the maleimide compounds are selected from the group consisting of maleimide, N-methylmaleimide, N-butylmaleimide, N-(p-methylphenyl)maleimide, N-phenylmaleimide and N-cyclohexylmaleimide, and the epoxy compounds are glycidyl methacrylate.

15. The rubber-reinforced styrene resin composition according to claim 1, wherein the at least one other copolymerizable monomer of the monomer components (A), (A') and (A") is selected from the group consisting of methyl methacrylate and a maleimide compound.

16. The rubber-reinforced styrene resin composition according to claim 1, wherein the rubbery polymers (I) and (II) are independently at least one member selected from the group consisting of polybutadiene, polyisoprene, styrene-butadiene random copolymer, acrylonitrile-butadiene copolymer and styrene-butadiene block copolymer.

17. The rubber-reinforced styrene resin composition according to claim 1, wherein the rubbery polymers (I) and (II) are independently at least one member selected from the group consisting of polybutadiene and styrene-butadiene copolymer.

18. The rubber-reinforced styrene resin composition according to claim 1, wherein the rubbery polymer (I) is the same as rubbery polymer (II).

19. The rubber-reinforced styrene resin composition according to claim 1, wherein the ratio of the weight average particle size of the rubbery polymer (I) to the weight average particle size of the rubbery polymer (II) is about 1.

20. The rubber-reinforced styrene resin composition according to claim 1, wherein the rubbery polymers (I) and (II) have a gel content of 50–75% by weight.

21. The rubber-reinforced styrene resin composition according to claim 1, wherein the difference between the grafting degrees of the grafted rubbery polymers (1) and (2) is 25%.

22. A process for producing a rubber-reinforced styrene resin composition of claim 1, which comprises compounding:

(1') 5–40% by weight of a graft copolymer obtained by graft-polymerizing, in the presence of 5–80 parts by weight of a rubbery polymer (I) having a weight average particle size of 0.28–0.45 μm and a gel content of 40–75% by weight, 95–20 parts by weight of a monomer component (A) consisting of (a) 10–95% by weight of at least one aromatic alkenyl compound, (b) 1–60% by weight of at least one alkenyl cyanide compound and (c) 0–89% by weight of at least one other copolymerizable monomer wherein (a)+(b)+(c)= 100% by weight, and (I)+(A)=100 parts by weight, the grafting degree of the grafted rubbery polymer contained in the graft copolymer ranging from 5 to 25% by weight, (2') 5–80% by weight of a graft copolymer obtained by graft-polymerizing, in the presence of 5–80 parts by weight of a rubbery polymer (II) having a weight average particle size of 0.28–0.45 μm and a gel content of 40–75% by weight, 95–20 parts by weight of a monomer component (A') consisting of (a') 10–95% by weight of at least one aromatic alkenyl compound, (b') 1–60% by weight of at least one alkenyl cyanide compound and (c') 0–89% by weight of at least one other copolymerizable monomer wherein (a')+(b')+ (c')=100% by weight and (II)+(A')=100 parts by weight, the grafting degree of the grafted rubbery polymer contained in the graft copolymer ranging from 40–120% by weight, (3') 0–60% by weight of a styrene polymer obtained by copolymerizing of a monomer component (A''') consisting of (a''') 10–95% by weight of at least one aromatic alkenyl compound, (b''') 0–60% by weight of at least one alkenyl cyanide compound, (c''–1) 0.5–80% by weight of at least one maleimide compound and (c''–2) 0–80% by weight of at least one other copolymerizable monomer wherein (a'')+(b'')+(c''–1)+ (c''–2)=100% by weight, and (4') 0–60% by weight of a styrene polymer obtained by copolymerizing of a monomer component (A''') consisting of (a''') 10–95% by weight of at least one aromatic alkenyl compound, (b''') 1–60% by weight of at least one alkenyl cyanide compound and (c''') 0–89% by weight of at least one other copolymerizable monomer wherein (a''')+(b''')+(c''')=100% by weight, wherein (1')+(2')+(3')+(4')=100% by weight;

said styrene polymer components (3') and (4') having an intrinsic viscosity of 0.2–0.8 dl/g as measured at 25° C. in methyl ethyl ketone, the difference between the grafting degree of component (1') and the grafting degree of component (2') is 20% by weight or more; and the ratio of the particle size of component (1') to that of component (2') is 0.9–1.2.

23. The process according to claim 22, wherein the ratio of the component (1')/the component (2')/the component (3')/the component (4') is 7–35/10–70/5–55/0–50% by weight.

24. The process according to claim 22, wherein the aromatic alkenyl compound of each of the monomer components (A) to (A''') is at least one member selected from the group consisting of styrene, t-butylstyrene, α-methylstyrene, p-methylstyrene, N,N-diethyl-p-methylstyrene, divinylbenzene, N,N-diethyl-p-aminoethylstyrene, vinylpyridine, vinylxylene, monochlorostyrene, dichlorostyrene, monobromostyrene, fluorostyrene, ethylstyrene and vinylnaphthalene.

25. The process according to claim 22, wherein the aromatic alkenyl compound of each of the monomer components (A) to (A''') is at least one member selected from the group consisting of styrene and α-methylstyrene.

26. The process according to claim 22, wherein the alkenyl cyanide compound of each of the monomer components (A) to (A''') is at least one member selected from the group consisting of acrylonitrile and methacrylonitrile.

27. The process according to claim 22, wherein the at least one other copolymerizable monomer of each of the monomer components (A) to (A''') is at least one member selected from the group consisting of acrylic acid esters, methacrylic acid esters, unsaturated dicarboxylic acid anhydrides, unsaturated monocarboxylic acids, maleimide compounds and epoxy compounds.

28. The process according to claim 22, wherein the acrylic acid esters are selected from the group consisting of methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate and benzyl acrylate; the methacrylic acid esters are selected from the group consisting of methyl methacrylate, ethyl methacrylate, propyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate; the unsaturated dicarboxylic acid anhydrides are selected from the group consisting of maleic anhydride, itaconic anhydride and citraconic anhydride; the unsaturated monocarboxylic acids are selected from the group consisting of acrylic acid and methacrylic acid; the maleimide compounds are selected from the group consisting of maleimide, N-methylmaleimide, N-butylmaleimide, N-(p-methylphenyl)maleimide, N-phenylmaleimide and N-cyclohexylmaleimide; and the epoxy compounds are glycidyl methacrylate.

29. The process according to claim 22, wherein the at least one other copolymerizable monomer of each of the monomer components (A) to (A''') is at least one member selected from the group consisting of methyl methacrylate and a maleimide compound.

30. The process according to claim 22, wherein the rubbery polymers (I) and (II) are independently at least one member selected from the group consisting of diene rubbery polymers.

31. The process according to claim 30, wherein the diene rubbery polymers are selected from the group consisting of polybutadiene, polyisoprene, styrene-butadiene random copolymer, acrylonitrile-butadiene copolymer and styrene-butadiene block copolymer.

32. The process according to claim 22, wherein the rubbery polymers (I) and (II) are independently at least one member selected from the group consisting of poly-butadiene and styrene-butadiene copolymer.

33. The process according to claim 22, wherein the styrene polymer components (3') and (4') have a number average molecular weight of $3 \times 10^4$ to $15 \times 10^4$.

34. A process for producing a rubber-reinforced styrene resin composition of claim 1, which comprises compounding:

(1') 2–30% by weight of a graft copolymer obtained by graft-polymerizing, in the presence of 5–80 parts by weight of a rubbery polymer (I) having a weight average particle size of 0.28–0.45 μm and a gel content of 40–75% by weight, 95–20 parts by weight of a monomer component (A) consisting of (a) 10–95% by weight of at least one aromatic alkenyl compound, (b) 1–60% by weight of at least one alkenyl cyanide compound and (c) 0–89% by weight of at least one other copolymerizable monomer wherein (a)+(b)+(c)= 100% by weight, and (I)+(A)=100 parts by weight, the grafting degree of the grafted rubbery polymer contained in the graft copolymer ranging from 5 to 25% by weight, (2') 5–40% by weight of a graft copolymer obtained by graft-polymerizing, in the presence of 5–80 parts by weight of a rubbery polymer (II) having a weight average particle size of 0.28–0.45 μm and a gel content of 40–75% by weight, 95–20 parts by weight of a monomer component (A') consisting of (a') 10–95% by weight of at least one aromatic alkenyl compound, (b') 1–60% by weight of at least one alkenyl cyanide compound and (c') 0–89% by weight of at least one other copolymerizable monomer wherein (a')+(b')+ (c')=100% by weight and (II)+(A')=100 parts by weight, the grafting degree of the grafted rubbery polymer contained in the graft copolymer ranging from 40–120% by weight, (3') 0–60% by weight of a styrene polymer obtained by copolymerizing of a monomer component (A''') consisting of (a") 10–95% by weight of at least one aromatic alkenyl compound, (b") 0–60% by weight of at least one alkenyl cyanide compound, (c"–1) 0.5–80% by weight of at least one maleimide compound and (c"–2) 0–80% by weight of at least one other copolymerizable monomer wherein (a")+(b")+(c"–1)+(c"–2)=100% by weight, and (4') 0–60% by weight of a styrene polymer obtained by copolymerizing of a monomer component (A''') consisting of (a''') 10–95% by weight of at least one aromatic alkenyl compound, (b''') 1–60% by weight of at least one alkenyl cyanide compound and (c''') 0–89% by weight of at least one other copolymerizable monomer wherein (a''')+(b''')+(c''')=100% by weight, wherein (1')+(2')+(3')+(4')=100 % by weight; with the total amount of components (3') and (4') ranging from 30 to 93% by weight of the composition and said styrene polymer components (3') and (4') having an intrinsic viscosity of 0.2–0.8 dl/g as measured at 25° C. in methyl ethyl ketone, the difference between the grafting degree of component (1') and the grafting degree of component (2') is 20% by weight or more; and the ratio of the particle size of component (1') to that of component (2') is 0.9–1.2.

35. The process according to claim 22, wherein the component (1') is a graft copolymer obtained by graft-polymerizing, in the presence of 10–65 parts by weight of a rubbery polymer (I), 90–35 parts by weight of a monomer component (A) consisting of (a) 20–80% by weight of at least one aromatic alkenyl compound, (b) 5–50% by weight of at least one alkenyl cyanide compound and (c) 0–75% by weight of at least one other copolymerizable monomer wherein (a)+(b)+(c)=100% by weight and (I)+(A)=100 parts by weight, the grafting degree of the grafted rubbery polymer contained in the graft copolymer ranging from 5 to 25% by weight; the component (2') is a graft copolymer obtained by graft-polymerizing, in the presence of 10–65 parts by weight of a rubbery polymer (II), 90–35 parts by weight of a monomer component (A') consisting of (a') 20–80% by weight of at least one aromatic alkenyl compound, (b') 5–50% by weight of at least one alkenyl cyanide compound and (c') 0–75% by weight of at least one other copolymerizable monomer wherein (a')+(b')+(c')=100% by weight and (II)+(A')=100 parts by weight, the grafting degree of the grafted rubbery polymer contained in the graft copolymer ranging from 40–120% by weight; the component (3') is a styrene polymer obtained by copolymerizing a monomer component (A'') consisting of (a'') 20–80% by weight of at least one aromatic alkenyl compound, (b'') 1–50% by weight of at least one alkenyl cyanide compound, (c''–1) 10–70% by weight of at least one maleimide compound and (c''–2) 0–75% by weight of at least one other copolymerizable monomer wherein (a'')+(b'')+(c''–1)+(c''–2)=100% by weight; and the component (4') is a styrene polymer obtained by copolymerizing a monomer component (A''') consisting of (a''') 20–80% by weight of at least one aromatic alkenyl compound, (b''') 5–50% by weight of at least one alkenyl cyanide compound and (c''') 0–75% by weight of at least one other copolymerizable monomer wherein (a''')+(b''')+(c''')=100% by weight.

* * * * *